J. C. FOOSHE.
SEED-PLANTER AND FERTILIZER-DISTRIBUTER.

No. 181,327.  Patented Aug. 22, 1876.

UNITED STATES PATENT OFFICE.

JOHN C. FOOSHE, OF GREENWOOD, SOUTH CAROLINA.

IMPROVEMENT IN SEED-PLANTER AND FERTILIZER-DISTRIBUTER.

Specification forming part of Letters Patent No. 181,327, dated August 22, 1876; application filed July 15, 1876.

*To all whom it may concern:*

Figure 1:
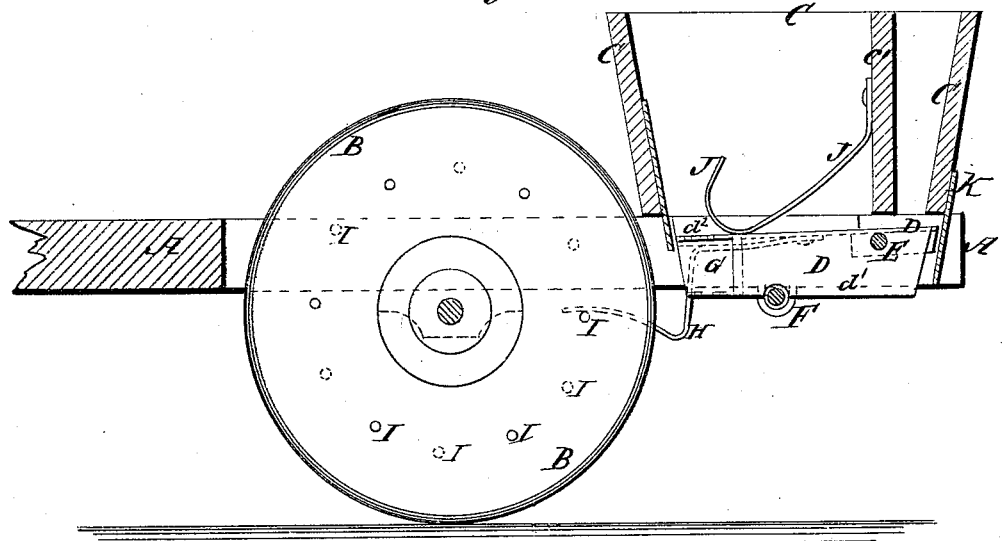
Figure 2:
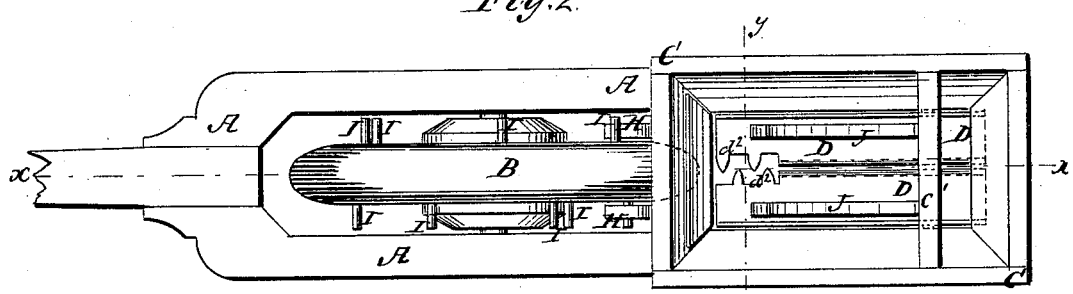
Figure 3:
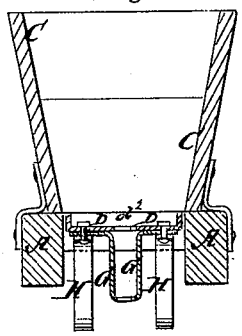
Figure 4:
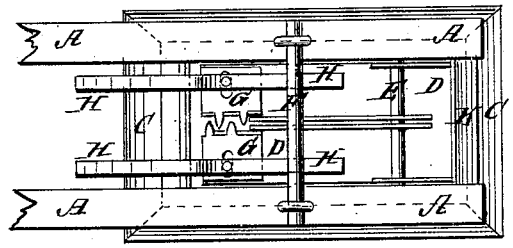

Be it known that I, JOHN COLEMAN FOOSHE, of Greenwood, county of Abbeville and State of South Carolina, have invented a new and Improved Seed-Planter and Fertilizer-Distributer, of which the following is a specification:

Figure 1 is a vertical longitudinal section of my improved machine, taken through the line $x\ x$, Fig. 2. Fig. 2 is a top view of the same. Fig. 3 is a vertical cross-section of the same, taken through the line $y\ y$, Fig. 2. Fig. 4 is a bottom view of the rear part of the same.

The object of this invention is to furnish an improved machine for planting cotton-seeds and other seeds, and for distributing guano and other fertilizers, and which shall be simple in construction and reliable in operation.

The invention consists in the combination of the hinged parts of the hopper-bottom, provided with the flanges, the teeth, and the adjustable bent toothed plates, the bent arms, the alternate pins, and the springs, with the hopper, the frame, and the wheel, and in the combination of the cross partition and the plate with the hopper and the rear ends of the hinged parts of the hopper-bottom, as hereinafter fully described.

Similar letters of reference indicate corresponding parts.

A is the frame of the machine, which is designed to be provided with an opening-plow, covering-plows, and handles, in the usual way, but which are not shown in the drawings. To the frame A is pivoted a wheel, B, the face of which is rounded off to adapt it to press back and pack the sides of the furrow, to keep it open to receive the seed. C is the seed-hopper, which is attached to the frame A in the rear of the wheel B, and which is divided into two compartments by a cross-partition, $c'$, the rear compartment being designed to receive a fertilizer when it is desired to distribute a fertilizer in the drill at the same time with the seed. The bottom of the hopper is made in two equal parts, D, which are hung upon a rod, E, attached to the frame A, and which is placed beneath the partition $c'$. Upon the adjacent edges of the parts D of the hopper-bottom are formed downwardly-projecting flanges $d^1$, so that there will be no opening between the said edges as the forward ends of said parts move up and down alternately. When the parts of the bottom are left free, the lower edges of the said flanges rest upon a rod, F, attached to the frame A. The forward parts of the adjacent edges of the parts D are cut away to form a slot for the escape of the seed, and upon the said parts at the sides of the said slot are formed points or teeth to take hold of the seed or fertilizer and draw it out. To the forward ends of parts D are attached plates G, which are bent downward and then inward, and have teeth formed upon their edges to assist in drawing out the seed. The plates G are slotted to receive the bolts by which they are secured to the parts D of the bottom, so that they may be adjusted toward or from each other as less or more seed is to be dropped. To the parts D of the bottom are attached arms H, which are bent downward and then forward, and project upon the opposite sides of the rear parts of the wheel B, so as to be struck by the pins I attached to the opposite sides of the wheel B in such a way as to alternate with each other. To the rear side of the hopper C or to the partition $c'$, when used, are attached the ends of springs J, which incline downward, and their forward ends are curved upward, so that their bends may rest upon the parts D of the hopper-bottom, and their said ends may project upward to serve as agitators to keep the contents of the hopper C stirred up, and cause them to pass out readily. By this construction, as the machine is drawn forward the pins I will strike the arms H and raise the parts D of the hopper-bottom alternately, and as the arms H slip from the pins I the parts D will be forced down by the springs J, the said parts D rising with a steady and gradual movement, and descending with a sudden impulse, which makes the feed more effective. As the forward ends of the parts D of the hopper-bottom move up and down a similar but shorter movement will be given to the rear ends of said parts, which will work the guano out of the rear compartment of the hopper, the upward movement of said ends crushing any lumps that there may be in said guano against the lower edge of the rear side of the hopper. The guano is guided downward as it escapes from the hopper by a plate, K, attached to its rear side.

Having thus described my invention, I claim as new and desire to secure by Letters Patent—

1. The combination of the hinged parts D of the hopper-bottom, provided with the flanges $d^1$, the teeth $d^2$, and the adjustable bent toothed plates G, the bent arms H, the alternate pins I, and the springs J with the hopper C, the frame A, and the wheel B, substantially as herein shown and described.

2. The combination of the cross-partition $c'$ and the plate K with the hopper C, and the rear ends of the hinged parts D of the hopper-bottom, substantially as herein shown and described.

JOHN COLEMAN FOOSHE.

Witnessses:
W. TELL. HENDERSON,
GEO. H. WADDELL,
S. B. HODGES.